United States Patent
Slater et al.

(10) Patent No.: US 6,870,695 B2
(45) Date of Patent: Mar. 22, 2005

(54) ABERRATION-CORRECTING WINDOW CONFIGURATIONS

(75) Inventors: Joseph B. Slater, Dexter, MI (US); Kevin L. Davis, Ann Arbor, MI (US)

(73) Assignee: Kaiser Optical Systems, Ann Arbor, MI (US)

( * ) Notice: Subject to any disclaimer, the term of this patent is extended or adjusted under 35 U.S.C. 154(b) by 0 days.

(21) Appl. No.: 10/734,058

(22) Filed: Dec. 11, 2003

(65) Prior Publication Data

US 2004/0136103 A1 Jul. 15, 2004

Related U.S. Application Data

(60) Provisional application No. 60/432,597, filed on Dec. 11, 2002.

(51) Int. Cl.$^7$ ............................. G02B 27/00; G02B 5/00
(52) U.S. Cl. ...................... 359/894; 359/440; 220/663; 116/276; 73/323
(58) Field of Search ................................ 359/894, 895, 359/440, 609; 220/663; 116/276; 73/323, 325, 330, 334

(56) References Cited

U.S. PATENT DOCUMENTS 3,578,407 A * 5/1971 Arnold et al. .............. 422/310
3,788,730 A * 1/1974 Greenleaf .................... 359/665

* cited by examiner

*Primary Examiner*—Leo Boutsikaris
(74) *Attorney, Agent, or Firm*—Gifford, Krass, Groh, Sprinkle, Anderson & Citkowski, PC

(57) ABSTRACT

An optical configuration suited to the monitoring of a process flow through the wall of a containment vessel for producing a high-quality, high-NA sample focus and reduced residual positive spherical aberration. The invention includes an optical path with a window extending through, and sealed to, the wall of the containment vessel, and an optical surface disposed in the optical path associated with minimizing aberration, increasing numerical aperture, or both. The window has a surface facing into the process flow and a surface facing away from the process flow and, the surface facing away from the process flow is associated with minimizing aberration or increasing numerical aperture. A lens is disposed outside the containment vessel and in the optical path, with the surface of the window facing the lens being substantially spherical. With such an arrangement, the light rays of the optical path are generally normal to the surface of the window facing the lens.

17 Claims, 3 Drawing Sheets

ABERRATION-CORRECTING WINDOW CONFIGURATIONS

REFERENCE TO RELATED APPLICATION

This application claims priority to U.S. Provisional Patent Application Ser. No. 60/432,597, filed Dec. 11, 2002, the entire content of which is incorporated herein by reference.

FIELD OF THE INVENTION

This invention relates generally to optical measurement probes and, in particular, to an aberration correcting window configuration suited to on-line process control and other applications.

BACKGROUND OF THE INVENTION

Induced radiative effects such as Raman scattering and fluorescence have become extremely valuable tools associated with the non-destructive determination of molecular constituents. Optical probes for such purposes are being employed in on-line process control in increasing numbers. These probes are often installed directly into the process stream or reactor, thus posing a potential safety hazard.

Free-space optical spectroscopy probes used in immersed applications typically involve imaging an optical sampling beam through a window bonded in the wall of a containment vessel. The window can be any material transparent to wavelengths of interest, though the most popular is sapphire. Typically the window is simply a flat surfaced window. As shown in FIG. 1, a lens 104 is commonly used behind the window 102 to focus the sampling beam into or onto the sample at 108. Another type of prior-art immersion optic on the market is shown in FIG. 2. In this case, a ball lens 210 serves the function of both the window and lens.

The amount of signal that can be obtained from the sample (particularly opaque samples) is related to the image quality of the sample beam at the focus and the numerical aperture NA. A higher NA yields a stronger, higher-quality signal. Also, the amount of data contamination from the signal caused by the window material is related to the numerical aperture of the sample beam and the type of aberrations it has.

FIG. 3 is a close-up diagram of the sample focus area for the flat window lens combination of FIG. 1. In this case, the lens is a diffraction-limited asphere which would produce a very high quality image absent the aberrating effect of the window. Other lenses, such including spherical optics could alternatively be used. The illustration shows the image is of reasonably high quality, but possesses a significant amount of negative spherical aberration due to the introduction of the window. With this type of aberration, the high NA components of the beam focus further away from the window than the low NA components. The low NA components have a greater depth of focus than the high NA components and therefore contribute more window signal contamination. The fact that the low NA components are close to the window exacerbates the signal contamination.

FIG. 4 shows the sample focus zone 212 for the ball lens of FIG. 2. In this case, there is a large amount of positive spherical aberration. This produces a relatively poor quality image and thus less overall signal, but due to the high NA components focusing close to the window and the low NA components further away, the window signal contamination is much less than with the flat window high quality lens combination.

SUMMARY OF THE INVENTION

This invention resides in an improved optical configuration suited to the monitoring of a process flow through the wall of a containment vessel. The arrangement is capable of producing a high-quality, high-NA sample focus that outperforms current options. One advantage is reduced residual positive spherical aberration to minimize window signal contamination.

The invention broadly includes an optical path with a window extending through, and sealed to, the wall of the containment vessel, and an optical surface disposed in the optical path associated with minimizing aberration, increasing numerical aperture, or both. The window has a surface facing into the process flow and a surface facing away from the process flow and, according to one configuration, the surface facing away from the process flow is associated with minimizing aberration or increasing numerical aperture.

One optical arrangement includes a lens disposed outside the containment vessel and in the optical path, with the surface of the window facing the lens being substantially spherical. With such an arrangement, the light rays of the optical path are generally normal to the surface of the window facing the lens. The window is preferably constructed of sapphire though the invention is not limited in this regard.

DETAILED DESCRIPTION OF THE INVENTION

This invention resides in an optical arrangement capable of producing a high-quality, high-NA sample focus that outperforms current options. The goal is broadly to have a small amount of residual positive spherical aberration to minimize window signal contamination.

Figure 5:
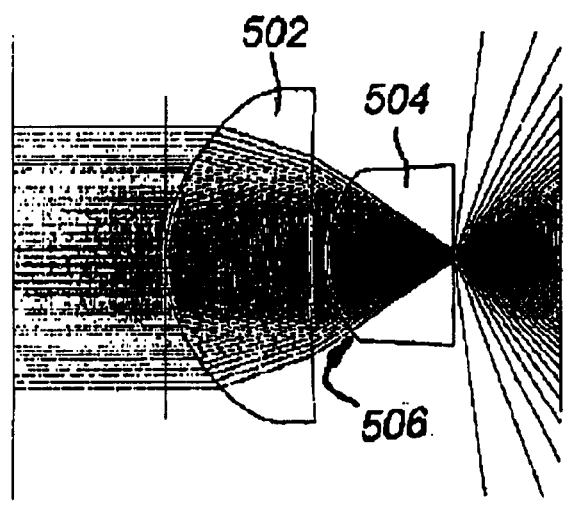
FIG. 5 depicts a preferred embodiment of the invention.

A preferred embodiment is shown in FIG. 5. By combining a high-quality lens 502 with a window 504 whose inner surface 506 is curved, aberrations are reduced while increasing the NA. Although the vessel wall is not shown, it is preferred that only the window 504 extends therethrough in sealed fashion.

Figure 1:
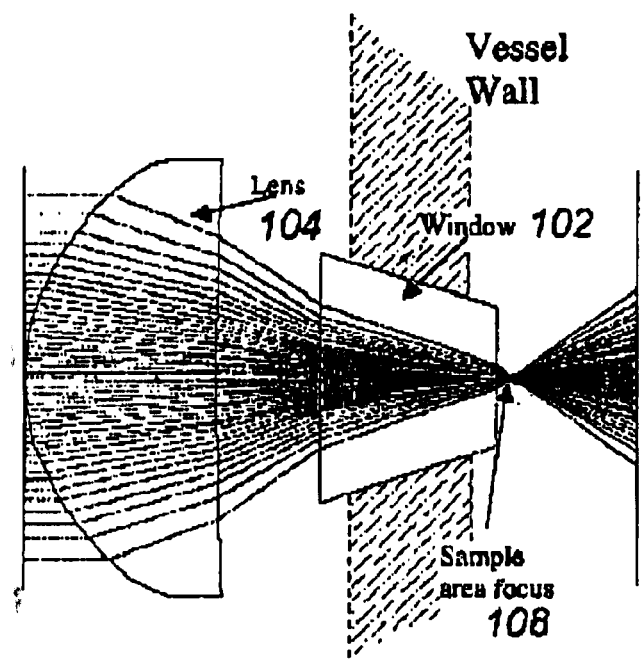
FIG. 1 is a drawing of a lens commonly used behind a window to focus a sampling beam into or onto the sample.
Figure 2:
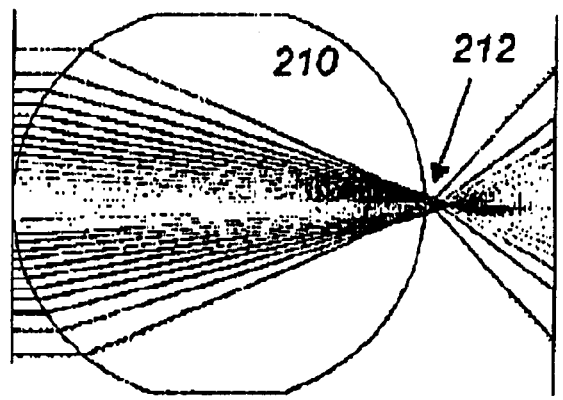
FIG. 2 shows another type of prior-art immersion optic.
Figure 3:
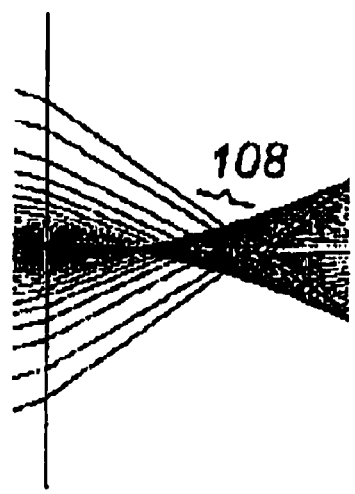
FIG. 3 is a close-up diagram of the sample focus area for the flat window lens combination of FIG. 1.
Figure 4:
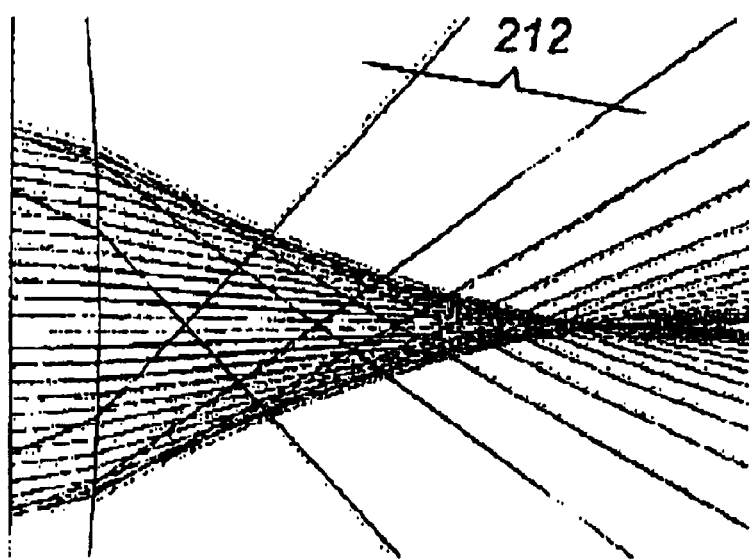
FIG. 4 shows the sample focus zone 212 for the ball lens of FIG. 2.
Figure 6:
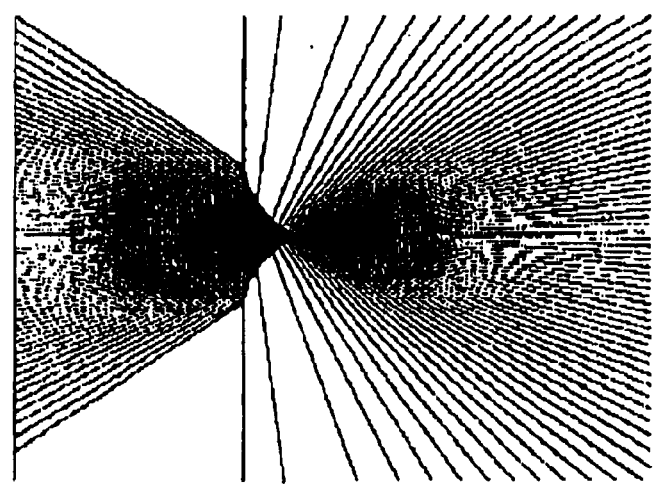
FIG. 6 is a close-up view of the focal zone for the arrangement of FIG. 5.

The invention takes advantage of beam-forming light rays at or near-normal incidence over the inner window surface, which greatly reduces the amount of aberration imparted to the beam. The position of the lens may be adjusted relative to the window so as to reduce the amount of residual positive spherical aberration which will improve the signal-to-window contamination ratio. FIG. 6 is a close-up view of the focal zone for this arrangement. Magnification is higher in FIG. 6 than in FIGS. 3 and 4 as the focal zone is much smaller.

The invention is not limited in terms of size or materials, though glass is preferred for the lens and again, sapphire is preferred for the window. More or fewer optical components may also be used according to the invention, in that the lens may use multiple elements as would be the case with an acromat. Although the lens is preferably separate from the window to facilitate separate cooling, the two may be bonded and, indeed, a single shaped window may be used though sapphire lenses with aspherical surfaces are currently expensive. Although the lens is shown as having an infinite conjugate, a finite conjugate arrangement may be used. The creation of a focal point could facilitate leak minimization geometries of the type disclosed in co-owned U.S. Pat. No. 6,603,545, the entire content of which is incorporated here by reference.

We claim:

1. An improved optical configuration suited to the monitoring of a process flow through the wall of a containment vessel, comprising:

an optical path including a solid window transparent to wavelengths of interest, extending through and sealed to the wall of the containment vessel; and a curved optical surface on the window for minimizing aberration, increasing numerical aperture, or both.

2. The improved optical configuration of claim 1, wherein:

the window has a surface facing into the process flow and a surface facing away from the process flow; and the surface facing away from the process flow is curved.

3. The improved optical configuration of claim 1, further including:

a lens disposed between the window and the containment vessel and in the optical path.

4. The improved optical configuration of claim 1, wherein the optical surface is substantially spherical.

5. The improved optical configuration of claim 3, wherein the arrangement of the lens and window is such that light rays of the optical path are generally normal to the surface of the window facing the lens.

6. The improved optical configuration of claim 1, including a sapphire window.

7. An improved optical configuration suited to the monitoring of a process flow through the wall of a containment vessel, comprising:

an optical path including a solid window transparent to wavelengths of interest, extending through and sealed to the wall of the containment vessel, the window including a curved optical surface; and a lens disposed in the optical path between the window and the vessel, the window and lens cooperatively minimizing aberration, increasing numerical aperture, or both.

8. The improved optical configuration of claim 7, wherein:

the window has a surface facing into the process flow and a surface facing the lens; and wherein the surface facing the lens is curved.

9. The improved optical configuration of claim 8, wherein the surface of the window facing the lens is substantially spherical.

10. The improved optical configuration of claim 8, wherein the light rays of the optical path are generally normal to the surface of the window facing the lens.

11. The improved optical configuration of claim 7, including a sapphire window.

12. The improved optical configuration of claim 1, wherein the curved surface is aspherical.

13. The improved optical configuration of claim 7, wherein the curved surface is aspherical.

14. The improved optical configuration of claim 3, wherein the lens includes multiple elements.

15. The improved optical configuration of claim 14, wherein the lens is an arcomat.

16. The improved optical configuration of claim 7, wherein the lens includes multiple elements.

17. The improved optical configuration of claim 16, wherein the lens is an arcomat.

* * * * *

UNITED STATES PATENT AND TRADEMARK OFFICE
CERTIFICATE OF CORRECTION

PATENT NO. : 6,870,695 B2
DATED : March 22, 2005
INVENTOR(S) : Joseph B. Slater and Kevin L. Davis It is certified that error appears in the above-identified patent and that said Letters Patent is hereby corrected as shown below:

Column 3,
Line 28, after the word "disposed" delete "between the window and," and insert -- outside --.

Column 4,
Line 8, after the word "path" delete "between the window and," and insert -- outside --.
Lines 31 and 35, delete "arcomat", insert -- achromat --.

Signed and Sealed this

Twenty-third Day of August, 2005

JON W. DUDAS
*Director of the United States Patent and Trademark Office*